United States Patent

Doi

(10) Patent No.: US 9,640,837 B2
(45) Date of Patent: May 2, 2017

(54) METHOD FOR PRODUCING SULFIDE SOLID ELECTROLYTE

(71) Applicant: TOYOTA JIDOSHA KABUSHIKI KAISHA, Toyota-shi, Aichi-ken (JP)

(72) Inventor: Takayoshi Doi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/167,033

(22) Filed: May 27, 2016

(65) Prior Publication Data

US 2016/0380305 A1 Dec. 29, 2016

(30) Foreign Application Priority Data

Jun. 29, 2015 (JP) .................. 2015-130290

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/0068* (2013.01)

(58) Field of Classification Search
CPC ........... H01M 10/0562; H01M 10/052; H01M 2300/0068
USPC ....................................... 429/304
See application file for complete search history.

(56) References Cited

U.S. PATENT DOCUMENTS

| 2014/0147753 A1* | 5/2014 | Homma | H01B 1/06 429/322 |
| 2015/0162614 A1* | 6/2015 | Koshika | H01M 4/13 429/189 |
| 2015/0340734 A1* | 11/2015 | Homma | H01B 1/06 429/322 |

FOREIGN PATENT DOCUMENTS

JP 2015-011898 A 1/2015

OTHER PUBLICATIONS

Computer translation of Suzuki et al. (JP 2015011898 A).*

* cited by examiner

*Primary Examiner* — Jonathan G Leong
*Assistant Examiner* — Aaron J Salter
(74) *Attorney, Agent, or Firm* — Oliff PLC

(57) ABSTRACT

The present invention is to provide a method for producing such a sulfide solid electrolyte that it has high lithium ion conductivity and the total amount of heat generated by the reaction with the charged anode material that proceeds at around 315° C., is reduced. Disclosed is a method for producing a sulfide solid electrolyte, wherein the method includes: a first step of preparing $Li_3PS_4$ having a γ structure, and a second step in which a second step mixture that contains the $Li_3PS_4$ having the γ structure obtained in the first step and LiX (where X is halogen) is non-crystallized, and the non-crystallized second step mixture is heated in a temperature range of more than 150° C. and less than 190° C.

5 Claims, 3 Drawing Sheets

METHOD FOR PRODUCING SULFIDE SOLID ELECTROLYTE

BACKGROUND OF THE INVENTION

Technical Field

The present invention relates to a method for producing a sulfide solid electrolyte.

Background Art

With the rapid spread of information-related devices and communication devices in recent years, great importance has been attached to the development of batteries that can be used as the power source of such devices. In the automobile industry, etc., high-output and high-capacity batteries for electric vehicles or hybrid vehicles are under development. Among various kinds of batteries under development, a lithium battery has attracted attention, from the viewpoint of its high energy density.

Currently, in a general lithium battery, a separator is used to separate a cathode and an anode from each other and is impregnated with an electrolyte that contains an organic solvent. Therefore, it is needed to increase the thickness of the separator. Accordingly, there is a problem that the separator accounts for a large proportion of the battery and results in low energy density. In the case of an all-solid-state lithium battery that uses a solid electrolyte layer in place of a liquid electrolyte, the thickness of the solid electrolyte layer that also serves as the separator can be decreased, so that the battery is excellent in terms of energy density. Also, a sulfide solid electrolyte is known as a solid electrolyte that is used in such a solid electrolyte layer.

Since the sulfide solid electrolyte has high lithium ion conductivity, it is useful for increasing battery output, and various studies have been made. For example, a production method is disclosed in Patent Document 1, in which a sulfide glass is obtained by non-crystallizing a raw material composition that contains at least $Li_2S$, $P_2S_5$, LiI and LiBr, and the sulfide glass is heated at 195° C. or more, thereby obtaining a sulfide solid electrolyte material with high lithium ion conductivity.

Patent Document 1: Japanese Patent Application Laid-Open No. 2015-11898

SUMMARY OF THE INVENTION

However, as a result of research, the inventor of the present invention has found the following: in a lithium ion battery produced by use of a sulfide solid electrolyte material obtained by the production method of the Patent Document 1, once the anode of the battery reaches a temperature range around 315° C., a reaction of the sulfide solid electrolyte material with a charged anode material proceeds, and the amount of heat generated by this reaction is large.

It is rare that the entire battery reaches a temperature range around 315° C. due to external short-circuit or overcharging. However, in the case of internal short-circuit or the like, the battery temperature may locally increase and reach a temperature range around 315° C. In the case where, as just described, the battery temperature locally reaches a temperature range around 315° C., the locally generated heat may have an influence on surrounding areas and generate more heat in the entire battery. However, such a situation can be prevented by reducing the heat generated by the above reaction.

The present invention was achieved in light of the above circumstance. An object of the present invention is to provide a method for producing such a sulfide solid electrolyte that it has high lithium ion conductivity and the total amount of the heat generated by the reaction of the sulfide solid electrolyte with the charged anode material, which proceeds in a temperature range around 315° C., is reduced.

The sulfide solid electrolyte production method of the present invention includes: a first step of preparing $Li_3PS_4$ having a γ structure, and a second step in which a second step mixture that contains the $Li_3PS_4$ having the γ structure obtained in the first step and LiX (where X is halogen) is non-crystallized, and the non-crystallized second step mixture is heated in a temperature range of more than 150° C. and less than 190° C.

In the first step of the sulfide solid electrolyte production method of the present invention, preferably, the $Li_3PS_4$ having the γ structure is obtained by non-crystallizing a first step mixture that contains $Li_2S$ and $P_2S_5$ in a molar ratio range of 74:26 to 76:24, and crystallizing the non-crystallized first step mixture by heating.

In the first step of the sulfide solid electrolyte production method of the present invention, preferably, the content of LiX in the first step mixture is less than 5.26% by mole with respect to the total amount of the $Li_2S$ and $P_2S_5$ therein.

In the first step of the sulfide solid electrolyte production method of the present invention, preferably, the sulfide solid electrolyte has peaks at 2θ=20°, 24° and 30° in X-ray diffraction measurement with CuKα radiation.

In the second step of the sulfide solid electrolyte production method of the present invention, preferably, the second step mixture is non-crystallized by mechanical milling.

According to the present invention, the method for producing such a sulfide solid electrolyte can be provided, that it has high lithium ion conductivity and the total amount of the heat generated by the reaction of the sulfide solid electrolyte with the charged anode material, which proceeds in a temperature range around 315° C., is reduced.

DETAILED DESCRIPTION OF THE INVENTION

Figure 1:
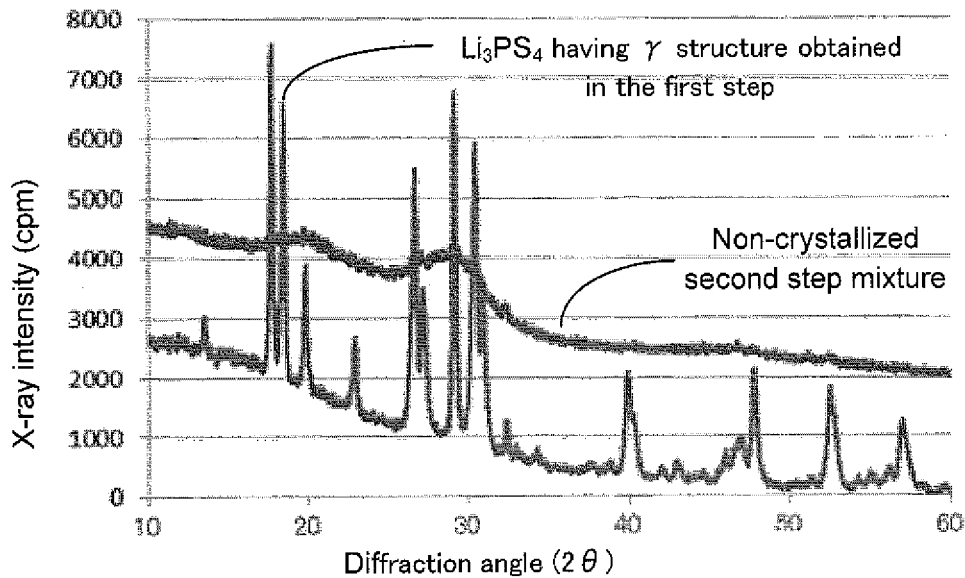
FIG. 1 is a view showing the results of X-ray diffraction measurement of $Li_3PS_4$ having a γ structure obtained in a first step and a non-crystallized second step mixture.

The sulfide solid electrolyte production method of the present invention includes: a first step of preparing $Li_3PS_4$ having a γ structure, and a second step in which a second step mixture that contains the $Li_3PS_4$ having the γ structure obtained in the first step and LiX (where X is halogen) is non-crystallized, and the non-crystallized second step mixture is heated in a temperature range of more than 150° C. and less than 190° C.

According to the present invention, such a sulfide solid electrolyte can be produced, that it has high lithium ion conductivity and the total amount of heat generated by the reaction of the sulfide solid electrolyte with a charged anode material, which proceeds in a temperature range around 315° C., is reduced.

(1) The First Step

In the production method of the present invention, the first step is a step of preparing the $Li_3PS_4$ having the γ structure.

By preparing in advance the $Li_3PS_4$ having the γ structure and high crystallinity in the first step, the sulfide solid electrolyte which contains the $Li_3PS_4$ having the γ structure, the $Li_3PS_4$ being the form of fine particles, containing less impurities and having a stable framework structure, can be obtained.

In the present invention, the $Li_3PS_4$ having the γ structure is $Li_2S_4$ that is observed to have peaks (2θ) at 17.82°±0.3°, 18.54°±0.3°, 19.98°±0.3°, 26.91°±0.3°, 29.34°±0.3° and 30.69°±0.3° by X-ray diffraction (XRD) measurement with CuKα radiation. They are representative peaks of the peaks in a typical XRD spectrum of γ-$Li_3PS_4$.

It is considered that crystallinity increases as the number of the peaks observed in a typical XRD spectrum of γ-$Li_3PS_4$ increases. Therefore, in addition to the representative peaks, the $Li_3PS_4$ having the γ structure preferably has peaks (2θ) at 13.59°±0.5°, 19.89°±0.5°, 23.04°±0.5°, 40.14°±0.5°, 47.25°±0.5°, 48.06°±0.5°, 52.92°±0.5° and 57.33°±0.5°.

In the present invention, there is no particular limitation on the method for preparing the $Li_3PS_4$ having the γ structure. For example, a commercially-available product can be used, or the $Li_3PS_4$ having the γ structure can be produced.

In the case of producing the $Li_3PS_4$ having the γ structure, preferably, the $Li_3PS_4$ having the γ structure is obtained by non-crystallizing a first step mixture that contains $Li_2S$ and $P_2S_5$ in a molar ratio range of 74:26 to 76:24, and crystallizing the non-crystallized first step mixture by heating.

In the present invention, non-crystallization is used in a broad sense and includes not only forming a non-crystalline body but also decreasing peaks in X-ray diffraction measurement and decreasing crystallinity.

In the present invention, the non-crystallizing method is not particularly limited. For example, it can be carried out by mechanical milling, or it can be carried out by a melting and rapid-quenching method.

In the first step, preferably, the content of LiX (where X is halogen) in the first step mixture is less than 5.26% by mole with respect to the total amount of the $Li_2S$ and $P_2S_5$ therein.

The LiX inhibits the formation of the $Li_3PS_4$ having the γ structure. Accordingly, when the content of the LiX is 5.26% by mole or more with respect to the total amount of the $Li_2S$ and the $P_2S_5$, it is difficult to obtain the $Li_3PS_4$ having the γ structure. It is more preferable that the LiX is not contained in the first step mixture.

There is no particular limitation on the condition of heating the non-crystallized first step mixture, as long as the $Li_3PS_4$ having the γ structure and high crystallinity can be obtained. In general, the non-crystallized first step mixture is heated at about 600° C. for 10 hours. By crystallizing the non-crystallized first step mixture by heating, as shown in FIG. 1, a crystal that has a typical spectrum of γ-$Li_3PS_4$ in XRD measurement, can be obtained.

(2) The Second Step

In the production method of the present invention, the second step is a step in which the second step mixture that contains the $Li_3PS_4$ having the γ structure obtained in the first step and the LiX (where X is halogen) is non-crystallized, and the non-crystallized second step mixture is heated in a temperature range of more than 150° C. and less than 190° C.

Instead of using $Li_2S$, $P_2S_5$, LiI and LiBr as in the prior-art techniques, by the use of the $Li_3PS_4$ having the γ structure and high crystallinity and the LiX as raw materials, the present invention makes it possible to obtain such a sulfide solid electrolyte that it has high lithium ion conductivity and the total amount of the heat generated by the reaction with the charged anode material at around 315° C., is reduced.

The LiX used in the second step is not particularly limited, as long as X is halogen. Preferably, X is I or Br.

As the LiX, a single compound can be used, or two kinds of compounds can be used. It is preferable to use two kinds of compounds, and it is preferable to use a mixture of LiI and LiBr.

There is no particular limitation on the mixing ratio of the $Li_3PS_4$ having the γ structure and the LiX. To efficiently obtain a sulfide solid electrolyte having high lithium ion conductivity, the mass ratio of LiX/$Li_3PS_4$ having the y structure is generally about 0.353 to 0.857.

Also, there is no particular limitation on the method for non-crystallizing the second step mixture in the second step. Preferably, it is carried out by mechanical milling.

As shown in FIG. 1, in XRD, any clear peak is not detected in the non-crystallized second step mixture. It is considered that the reason for the disappearance of the peaks assigned to γ-$Li_3PS_4$ is because the $Li_3PS_4$ having the γ structure was formed into very fine particles by mechanical milling, and it is not because the crystal structure of γ-$Li_3PS_4$ was broken. It is considered that in the non-crystallized second step mixture, the fine $Li_3PS_4$ having the γ structure and the LiX are present in a uniformly mixed state.

Next, the non-crystallized second step mixture is heated in a temperature range of more than 150° C. and less than 190° C. It is considered that by heating the non-crystallized second step mixture in this condition, a phase transition reaction of the $Li_3PS_4$ having the γ structure with the LiX proceeds in the non-crystallized second step mixture, so that a sulfide solid electrolyte having high lithium ion conductivity can be obtained.

When the heating temperature is 150° C. or less, the phase transition reaction does not proceed, so that a sulfide solid electrolyte having high lithium ion conductivity cannot be obtained. When the heating temperature is 190° C. or more, the $Li_3PS_4$ having the γ structure and low lithium ion conductivity is coarsened, so that a sulfide solid electrolyte having high lithium ion conductivity cannot be obtained.

The heating temperature is preferably 155° C. to 185° C., more preferably 160° C. to 180° C., still more preferably 165° C. to 175° C.

The reaction time is not particularly limited, as long as the phase transition reaction proceeds. Considering production efficiency, etc., the reaction time is generally about 1 to 5 hours.

During the heating, there is no particular limitation on humidity. Preferably, the humidity is low. A dew-point temperature of −50° C. or less is more preferred.

The heating of the non-crystallized second step mixture is preferably carried out under an inert gas atmosphere.

(3) The Sulfide Solid Electrolyte Obtained By the Production Method of the Present Invention The sulfide solid electrolyte obtained by the production method of the present invention is such a sulfide solid electrolyte that it has high lithium ion conductivity and the total amount of the heat generated by the reaction with the charged anode material, which proceeds in a temperature range around 315° C., is reduced.

The reason why the sulfide solid electrolyte of the present invention shows high lithium ion conductivity is not clear. However, it is considered as follows: a layer with high lithium ion conductivity, which was produced by the phase transition reaction due to the heating and at the interface between the $Li_3PS_4$ having the γ structure and the LiX, is widely and continuously distributed over the entire sulfide solid electrolyte, since the $Li_3PS_4$ having the γ structure is fine.

The reason why the present invention makes it possible to produce such a sulfide solid electrolyte that the total amount of the heat generated by the reaction of the sulfide solid electrolyte with the charged anode material, which proceeds around 315° C., is reduced, is not clear. However, it is presumed as follows.

In a state in which the sulfide solid electrolyte and the anode material are adjacent to each other inside the charged battery, once the battery temperature reaches around 315° C., it is considered that the reaction of the $Li_3PS_4$ in the sulfide solid electrolyte with a lithium metal produced from the charged anode material by heating to around 315° C., proceeds as follows:

$$Li_3PS_4 + 3Li \rightarrow 3Li_2S + PS$$

In the prior-art sulfide solid electrolytes, $Li_3PS_4$ with many impurities and low crystallinity is contained as the framework. In such sulfide solid electrolytes, the interface between the $Li_3PS_4$ and other component is not clear, and the lithium metal produced from the charged anode material can freely approach the $Li_3PS_4$, so that the above-mentioned reaction spreads over the entire sulfide solid electrolyte, and the amount of the generated heat increases.

In contrast, in the sulfide solid electrolyte produced by the present invention, the $Li_3PS_4$ having the γ structure, which serves as the framework, has high crystallinity and contains no impurities; therefore, the reaction with the lithium metal released from the anode material proceeds only on the surface of the $Li_3PS_4$ particles having the γ structure in the sulfide solid electrolyte. After the reaction, the $Li_2S$, which is a reaction product, forms a non-lithium metal conductive layer on the surface of the $Li_3PS_4$ particles having the γ structure. Therefore, the reaction stops while the $Li_3PS_4$ having the γ structure inside the particles remains unreacted.

Accordingly, in the sulfide solid electrolyte of the present invention, it is considered that compared to the prior-art sulfide solid electrolytes, the total amount of the heat generated at around 315° C., can be reduced to the amount corresponding to the unreacted $Li_3PS_4$ having the γ structure remaining inside the particles.

In the prior-art sulfide solid electrolyte production methods, if it is tried to increase crystallinity or purity by making $Li_3PS_4$ into a γ structure, a coarse $Li_3PS_4$ crystal having the γ structure and low lithium ion conductivity is grown; therefore, it is difficult to decrease the total amount of the heat generated at around 315° C., with maintaining high lithium ion conductivity.

In the sulfide solid electrolyte of the present invention, the total amount of the heat generated at around 315° C. is reduced; therefore, even if the battery temperature locally reaches a high temperature of 315° C. by internal short-circuit, etc., the amount of further generated heat is small. Accordingly, by the use of the sulfide solid electrolyte of the present invention, it is possible to produce a lithium ion battery which has such a property that the heat generation reaction in a temperature range around 315° C. is less likely to proceed compared to the prior-arts.

Preferably, the sulfide solid electrolyte obtained by the production method of the present invention has peaks at 2θ=20°, 24° and 30° in X-ray diffraction measurement with CuKα radiation. These peaks may have a margin of error of about ±0.5°, depending on the measurement condition.

As described above, the sulfide solid electrolyte of the present invention has the fine $Li_3PS_4$ having the γ structure and less impurities as the framework. Therefore, in the sulfide solid electrolyte of the present invention, any small heat generation at 300° C. or less is not observed, which is due to the reaction of the prior-art sulfide solid electrolyte having a mixture (e.g., $Li_3PS_4$ that contains many impurities and has low crystallinity) with the charged anode material.

Also in the sulfide solid electrolyte of the present invention, the phase transition temperature at which the production of the coarse $Li_3PS_4$ having the γ structure starts is around 190° C., and it is shifted to a temperature that is about 70° C. lower than the prior-art sulfide solid electrolytes.

It is considered that the reason is due to the following difference: in the sulfide solid electrolyte of the present invention, the fine $Li_3PS_4$ having the γ structure is coarsened by fusion; however, in the sulfide solid electrolyte of the prior art, the $Li_3PS_4$ which is contained therein and is a mixture that contains many impurities, has low crystallinity, and is contained in the prior-art sulfide solid electrolyte, is crystallized into the coarse $Li_3PS_4$ having the γ structure.

Because of having the above property, in the sulfide solid electrolyte of the present invention, the coarse $Li_3PS_4$ having the γ structure is produced at around 190° C., which is a temperature that is about 70° C. lower than the prior-art sulfide solid electrolytes, and it becomes a sulfide solid electrolyte having the property of blocking lithium ion conduction.

Therefore, a battery using the sulfide solid electrolyte of the present invention can be automatically shut down at around 190° C., when the temperature of the entire battery is increased by external short-circuit, overcharging, etc.

EXAMPLES

The present invention will be described in more detail, by way of examples. Operations such as weighing, synthesizing and drying were carried out under an Ar atmosphere kept at a dew point of −90° C. or less, unless otherwise noted.

[Synthesis of Sulfide Solid Electrolyte]

Example 1

(1) The First Step

First, 0.7655 g of $Li_2S$ (manufactured by Furuuchi Chemical Corporation) and 1.2345 g of $P_2S_5$ (manufactured by Sigma-Aldrich Japan) were weighted so that the molar ratio of $Li_2S$ and $P_2S_5$ is as follows: $Li_2S/P_2S_5$=75/25 (the raw material ratio (stoichiometric ratio) at which $Li_3PS_4$ is synthesized). Then, they were mixed to obtain a first step mixture.

Then, 2.0 g (the total amount) of the first step mixture, 53 g of zirconia balls having a diameter of 5 mm, and 4.0 g of super-dehydrated heptane were put in a 45 cc pot made of zirconia. Using a planetary ball mill, mechanical milling was carried out on the pot, thereby non-crystallizing the first step mixture. More specifically, the mechanical milling is as follows: a cycle of stirring at 500 rpm for one hour and then stopping the stirring for 15 minutes, was repeated 20 times, that is, a total of 20 cycles was carried out on the pot. The material composition is varied as needed. Hereinafter, the above condition is described as the standard condition of the mechanical milling.

The non-crystallized first mixture and the heptane were collected together and dried on a hot plate at 120° C., thereby obtaining a powder of the non-crystallized first step mixture from which the heptane was removed.

The powder of the non-crystallized first step mixture was vacuum-encapsulated in a carbon-coated quartz tube and heated in an air atmosphere furnace at 600° C. for 10 hours, thereby obtaining $Li_3PS_4$ having a γ structure. The quartz tube was scratched with a diamond bar and broken, thereby collecting the $Li_3PS_4$ having, the γ structure.

(2) The Second Step

Then, 1.570 g of the $Li_3PS_4$ having the γ structure obtained in the first step, 0.2845 g of LiI (manufactured by Sigma-Aldrich Japan) and 0.1846 g of LiBr (manufactured by Kojundo Chemical Laboratory Co., Ltd.) were weighed and mixed to obtain a second step mixture.

Then, they were mixed to obtain a mixture. Mechanical milling was carried out on the mixture in the standard condition, thereby non-crystallizing the mixture.

The non-crystallized mixture was heated on a hot plate at 205° C. for three hours, thereby obtaining the sulfide solid electrolyte of Comparative Example 3.

Comparative Example 4

The sulfide solid electrolyte of Comparative Example 4 was obtained in the same manner as Comparative Example 3, except that the non-crystallized mixture was heated on a hot plate at 195° C.

Comparative Example 5

The sulfide solid electrolyte of Comparative Example 5 was obtained in the same manner as Comparative Example 3, except that the non-crystallized mixture was heated on a hot plate at 215° C.

A table comparing the production steps of Example 1 and Comparative Examples 1 to 5 is shown below. For the sake of simplicity, the production step of Comparative Examples 3 to 5 is described as the second step.

TABLE 1

| | | Example 1 | Comparative Example 1 | Comparative Example 2 | Comparative Example 3 | Comparative Example 4 | Comparative Example 5 |
|---|---|---|---|---|---|---|---|
| The first step | | Yes | Yes | Yes | No | No | No |
| The second step (The step of Comparative Examples 3 to 5 is described as the second step.) | Total amount of raw materials (g) | 2.0391 | 2.0391 | 2.0391 | 2.0000 | 2.0000 | 2.0000 |
| | $Li_3PS_4$ having γ structure (g) | 1.57 | 1.57 | 1.57 | 0 | 0 | 0 |
| | $Li_2S$ (g) | 0 | 0 | 0 | 0.5850 | 0.5860 | 0.5860 |
| | $P_2B_3$ (g) | 0 | 0 | 0 | 0.9449 | 0.9449 | 0.9449 |
| | LiI (g) | 0.2845 | 0.2845 | 0.2845 | 0.2845 | 0.2845 | 0.2845 |
| | LiBr (g) | 0.1846 | 0.1845 | 0.1846 | 0.1846 | 0.1846 | 0.1846 |
| | Heating Temperature (° C.) | 170 | 190 | 150 | 205 | 195 | 215 |

Mechanical milling was carried out on the second step mixture in the standard condition, thereby non-crystallizing the second step mixture.

The non-crystallized second step mixture was heated on a hot plate at 170° C. for three hours, thereby obtaining the sulfide solid electrolyte of Example 1.

Comparative Example 1

The sulfide solid electrolyte of Comparative Example 1 was obtained in the same manner as Example 1, except that in the second step, the non-crystallized second step mixture was heated at 190° C. for three hours.

Comparative Example 2

The sulfide solid electrolyte of Comparative Example 2 was obtained in the same manner as Example 1, except that in the second step, the non-crystallized second step mixture was heated at 150° C. for three hours.

Comparative Example 3

First, 0.586 g of $Li_2S$ (manufactured by Furuuchi Chemical Corporation), 0.9449 g of $P_2S_5$ (manufactured by Sigma-Aldrich Japan), 0.2845 g of LiI (manufactured by Sigma-Aldrich Japan) and 0.1846 g of Liar (manufactured by Kojundo Chemical Laboratory Co., Ltd.) were weighed.

[Measurement of Li Ion Conductivity]

The sulfide solid electrolytes of Example 1 and Comparative Examples 1 to 5 were measured for Li ion conductivity. First, each sample was cold pressed at a pressure of 4 ton/cm², thereby producing a pellet having an area of 1 cm² and a thickness of about 500 μm. Next, the pellet was placed and measured in a container in an inert atmosphere filled with Ar gas. For the measurement, Solartron (product name: SI1260, manufactured by: TOYO Corporation) was used. The measurement temperature was set to 25° C. using a thermostat bath.

Figure 2:
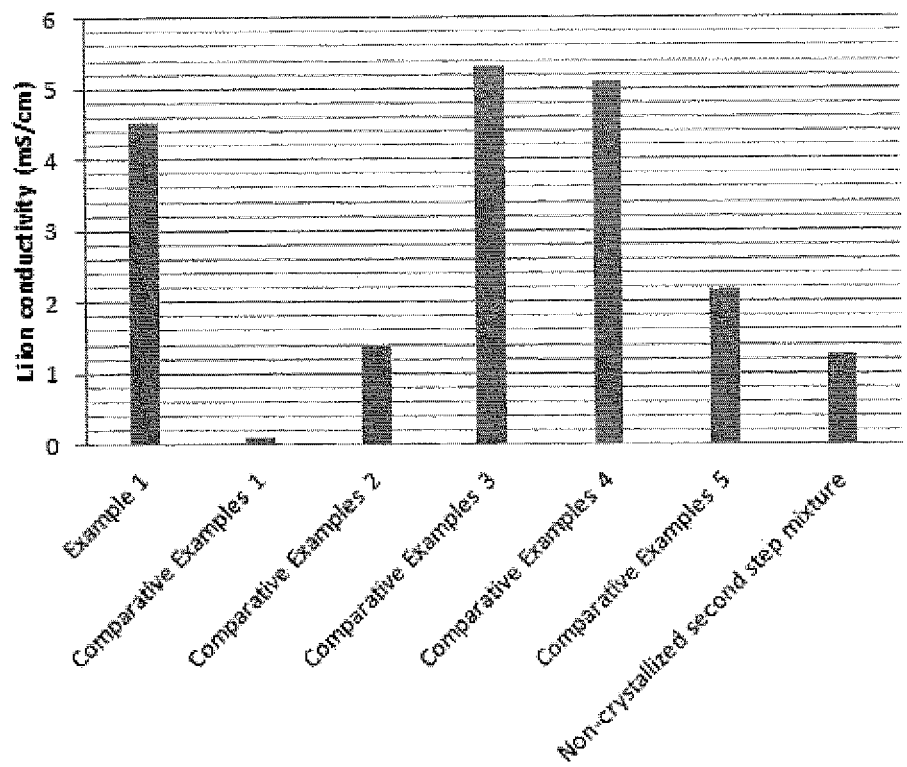
FIG. 2 is a view comparing the lithium ion conductivities of the sulfide solid electrolytes of Example 1 and Comparative Examples 1 to 5.

The results are shown in FIG. 2. For reference, FIG. 2 also shows the result of the non-crystallized second step mixture.

[X-Ray Diffraction Measurement]

Figure 3:
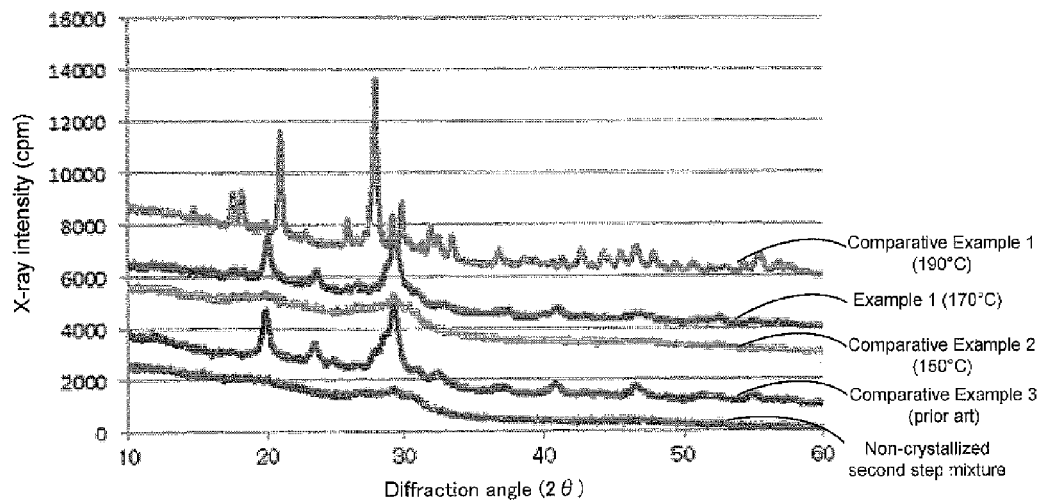
FIG. 3 is a view showing the results of X-ray diffraction measurement of the sulfide solid electrolytes of Example 1 and Comparative Examples 1 to 3.

Powder X-ray diffraction measurement with CuKα radiation was carried out using an XRD device (product name: RINT-Ultima III, manufactured by: Rigaku Corporation). Each sample was placed in a dome-shaped jig and measured in an inert atmosphere of Ar gas, in a range of 2θ=10° to 60°. The scan speed was set to 5°/min. The sampling width was set to 0.02°. FIG. 1 shows the results of the X-ray diffraction measurement carried out on the $Li_3PS_4$ having the y structure obtained in the first step and the non-crystallized second step mixture. FIG. 3 shows the results of the X-ray diffraction measurement carried out on the sulfide solid electrolytes of Example 1 and Comparative Examples 1 to 3. For reference, FIG. 3 also shows the result of the non-crystallized second step mixture.

[Thermogravimetry-Differential Thermal Analysis]

Figure 4:
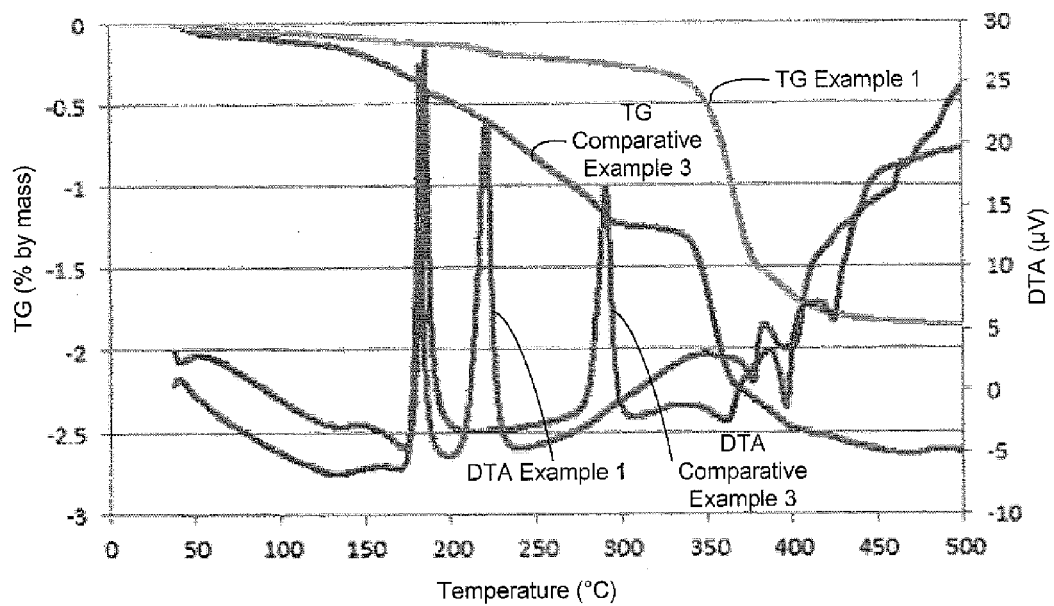
FIG. 4 is a view showing the results of TG-DTA measurement of the non-crystallized second step mixture of Example 1 and the non-crystallized mixture of Comparative Example 3.

Thermogravimetry (TG)-differential thermal analysis (DTA) was carried out on the non-crystallized second step mixture of Example 1 and the non-crystallized mixture of Comparative Example 3. For measurement, a TG-DTA device (product name: Thermo plus EVO, manufactured by: Rigaku Corporation) was used. An aluminum sample dish was used. As reference sample, $\alpha$-$Al_2O_3$ powder was used. The TG-DTA was carried out by use of 20 mg to 26 mg of each measurement sample and by increasing the temperature of the device from room temperature to 500° C. at 10° C./min in an Ar gas atmosphere. The results are shown in FIG. 4.

[Differential Scanning Calorimetry]

Using each of the sulfide solid electrolytes of Example 1 and Comparative Example 3, a cathode mixture slurry (sulfide solid electrolyte ratio: 40% by mass, active material: ternary active material), a separator slurry (sulfide solid electrolyte: 100% by mass) and an anode mixture slurry (sulfide solid electrolyte ratio: 50% by mass, active material: artificial graphite) were prepared. Each slurry was applied to a current collector foil made of SUS and naturally dried. The dried cathode mixture, separator and anode mixture were stamped out. After removing the foil of the separator, the three layers were stacked.

The stack of the three layers was installed in a mold of hollow insulator and press-molded, thereby producing an all-solid-state lithium battery.

Figure 5:
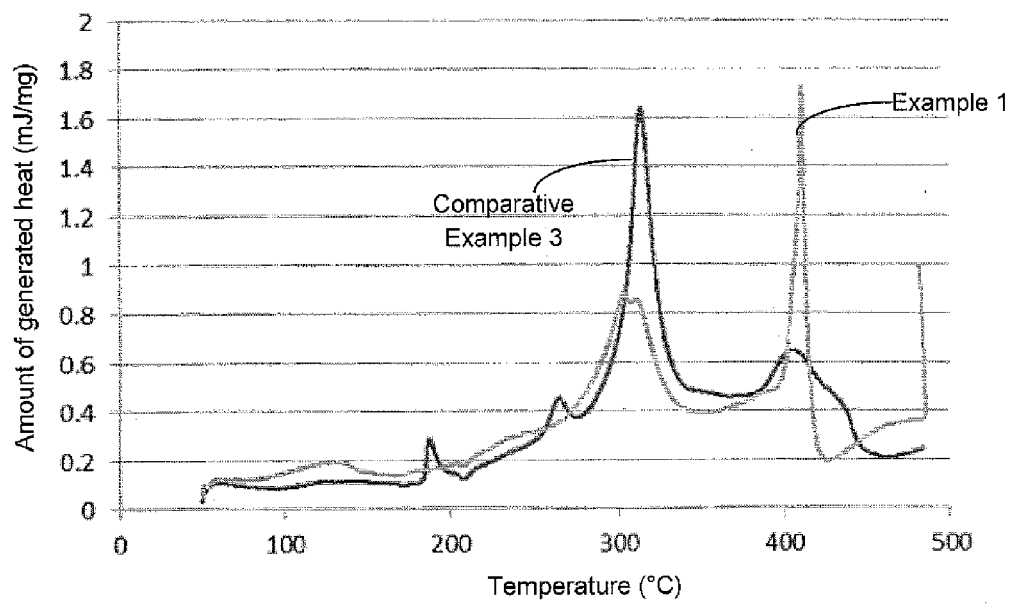
FIG. 5 is a view showing the results of DSC measurement of a charged anode mixture containing the sulfide solid electrolyte of Example 1 and a charged anode mixture containing the sulfide solid electrolyte of Comparative Example 3.

External voltage was applied to the all-solid-state battery produced. After the battery was charged to SOC 100%, the battery was dismantled. Only the anode mixture was scraped off and used as a sample for differential scanning calorimetry (DSC) measurement. A DSC device (product name: DSC-7000X, manufactured by: Hitachi High-Tech Science Corporation) was used for the measurement. About 20 mg of the sample was packed into a closed container for the DSC measurement. Then, the measurement of the amount of absorbed heat and the amount of generated heat was carried out at a heating rate of 10° C./min. The results are shown in FIG. 5.

(Evaluation Results)

As shown in FIG. 1, by the XRD measurement, the sample of the $Li_3PS_4$ having the $\gamma$ structure obtained in the first step, showed a typical spectrum of $\gamma$-$Li_3PS_4$ which has peaks (2θ) at 13.52°, 17.70°, 18.40°, 19.80°, 22.96°, 26.66°, 29.18°, 30.50°, 39.90°, 46.76°, 47.72°, 52.46° and 56.90°. For the second step mixture non-crystallized in the second step, any clear peak was not observed by the XRD measurement. It is considered that the crystal structure of $\gamma$-$Li_3PS_4$ is not broken even if mechanical milling is carried out in the above-mentioned standard condition. Therefore, it was considered that the particles of the $Li_3PS_4$ having the $\gamma$ structure, which are such fine particles that any clear peak is not observed by the XRD measurement, are contained in the non-crystallized second step mixture.

As shown in FIG. 3, as a result of the XRD measurement, the sulfide solid electrolyte of Comparative Example 1, which was obtained by heating the second step mixture non-crystallized in the second step at 190° C., showed a spectrum which has the characteristics of $\gamma$-$Li_3PS_4$. It was considered that since the heating temperature is as high as 190° C., the $Li_3PS_4$ having the $\gamma$ structure and very low lithium ion conductivity was coarsened, so that the sulfide solid electrolyte of Comparative Example 1 has low lithium ion conductivity, as shown in FIG. 2.

Also, as shown in FIG. 3, as a result of the XRD measurement, the sulfide solid electrolyte of Comparative Example 2 which was obtained by heating the second step mixture non-crystallized in the second step at 150° C., did not show any clear peak, and the spectrum showed almost no change compared to second step mixture non-crystallized in the second step (before the heating). It was considered that at a heating temperature of 150° C., the $Li_3PS_4$ having the $\gamma$ structure, the LiI and the LiBr are not reactive and are not able to form a lithium ion conductive layer, so that the sulfide solid electrolyte of Comparative Example 2 has low lithium ion conductivity, as shown in FIG. 2.

Meanwhile, the sulfide solid electrolyte of Example 1 which was obtained by heating the second step mixture non-crystallized in the second step at 170° C., showed lithium ion conductivity that is, as shown in FIG. 2, similar to those of the sulfide solid electrolytes of Comparative Examples 3 to 5 which were produced by the prior-art production method.

As shown in FIG. 3, the spectra obtained by the XRD measurement of the sulfide solid electrolytes of Example 1 and Comparative Example 3 (which has the highest lithium ion conductivity among Comparative Examples 3 to 5) are similar in that they have peaks at 2θ=20°, 24° and 30°, and they were considered to be a common characteristic among sulfide solid electrolytes having high lithium ion conductivity.

As shown in DTA measurement results in FIG. 4, the non-crystallized second step mixture of Example 1 and the non-crystallized mixture of Comparative Example 3 have such a common characteristic that they have an exothermic peak (hereinafter may be referred to as first exothermic peak) around 185° C. It was considered that this exothermic peak means the progression of the phase transition reaction of the $Li_3PS_4$ and the LiX, and the lithium ion conductive layer is formed in the sulfide solid electrolyte by hating at around 185° C.

In Example 1, the lithium ion conductive layer is formed by heating at 170° C. Meanwhile, the reason for the exothermic peak observed at around 185° C. in the DTA measurement, is considered as follows: since the heating rate is 10° C./min in the DTA, there is a time lag between reaching 170° C. and the start of the reaction.

Clear differences were found in the sulfide solid electrolytes of Example 1 and Comparative Examples 3 to 5.

The first difference is as follows: according to the results of the DSC measurement shown in FIG. 5, which was carried out to evaluate the reactivity of the sulfide solid electrolyte with the charged anode material, for the sulfide solid electrolyte of Example 1, the exothermic peak at around 315° C. is smaller and the total amount of the generated heat is about 16.7% lower compared to the sulfide solid electrolyte of Comparative Example 3, which was measured as a representative from Comparative Examples 3 to 5.

As described above, it is considered that the exothermic peak at around 315° C. is due to the reaction of the $Li_3PS_4$ in the sulfide solid electrolyte and the lithium metal released from the charged anode material.

In the sulfide solid electrolyte of Comparative Example 3, the $Li_3PS_4$, which serves as a framework, has low crystallinity and contains many impurities. Therefore, the interface between the $Li_3PS_4$ and other component is not clear, so that the lithium metal can freely approach the $Li_3PS_4$. Therefore, the reaction of the $Li_3PS_4$ and the lithium metal spreads over the entire sulfide solid electrolyte.

In contrast, in the sulfide solid electrolyte of Example 1, the $Li_3PS_4$ having the $\gamma$ structure, which serves as a framework, has high crystallinity and contains no impurities.

Therefore, the interface between the $Li_3PS_4$ particles having the γ structure and other component is clear, so that a non-lithium metal conductive layer formed on the surface of the $Li_3PS_4$ particles having the γ structure by the reaction of the $Li_3PS_4$ having the γ structure and the lithium metal, inhibits the progression of the reaction inside the particles.

It was considered that this difference leads to the reduction in the total amount of the heat generated by the sulfide solid electrolyte of the present invention at around 315° C.

As shown in FIG. 5, unlike Comparative Example 3, a clear exothermic peak is observed at around 411° C. in Example 1. The reason was considered as follows: at around 315° C., the reaction of the $Li_3PS_4$ having the γ structure and the lithium metal is inhibited inside the particles, by the non-lithium metal conductive layer formed on the surface of the $Li_3PS_4$ particles having the γ structure; however, at around 411° C., the non-lithium metal conductive layer becomes a lithium metal conductive layer, and the reaction proceeds inside the $Li_3PS_4$ particles having the γ structure.

Also from FIG. 5, it is clear that the small exothermic peak observed at 300° C. or less in Comparative Example 3 disappeared in Example 1. It is considered that the heat generation at 300° C. or less is due to the reaction of the impurities in the sulfide solid electrolyte of Comparative Example 3 with the charged anode material. It was considered that since, as described above, no impurities are contained in the sulfide solid electrolyte of Example 1, heat generation does not occur at 300° C. or less.

The second difference is as follows: as shown in the TG measurement results in FIG. 4, according to the TG measurement of the non-crystallized second step mixture of Example 1 and the non-crystallized mixture of Comparative Example 3, in a range of 200° C. to 350° C., the weight reduction rate of Comparative Example 3 is larger than that of Example 1.

In the TG-DTA measurement test, at the time of reaching the first exothermic peak at around 185° C., the lithium ion conductive layer is formed in the sulfide solid electrolyte. Therefore, in FIG. 4, at the time of exceeding 185° C., the non-crystallized second step mixture of Example 1 can be considered as the sulfide solid electrolyte of Example 1, and the non-crystallized mixture of Comparative Example 3 can be considered as the sulfide solid electrolyte of Comparative Example 3.

It was considered that the difference in weight reduction rate results from the following difference: the sulfide solid electrolyte of Example 1 contains less impurities, so that it is less likely to reduce its weight even when it is heated; however, the sulfide solid electrolyte of Comparative Example 3 contains many impurities, so that it is likely to reduce its weight.

The third difference is as follows: as shown by the DTA measurement results in FIG. 4, the exothermic peak the sulfide solid electrolyte of Comparative Example 3 has at around 291° C. (hereinafter it may be referred to as second exothermic peak) is shifted to a lower temperature of around 221° C. in the case of the sulfide solid electrolyte of Example 1. The temperature of the second exothermic peak is a phase transition temperature at which the production of the coarse $Li_3PS_4$ having the γ structure and low lithium ion conductivity starts.

In the sulfide solid electrolyte of Example 1, the fine $Li_3PS_4$ having the γ structure is coarsened by fusion. Therefore, it was considered that the second exothermic peak shifted to a temperature that is about 70° C. lower, because less energy is required than the reaction of the $Li_3PS_4$ to be crystallized and coarsened, which is a mixture that contains many impurities, has low crystallinity, and is contained in the sulfide solid electrolyte of Comparative Example 3.

From the above results, it is clear that a non-conventional sulfide solid electrolyte can be produced by the present invention, which is such a sulfide solid electrolyte that it has high lithium ion conductivity and the total amount of the heat generated by the reaction with the charged anode material that proceeds at around 315° C., is reduced.

The invention claimed is:

1. A method for producing a sulfide solid electrolyte, wherein the method comprises:
   a first step of preparing $Li_3PS_4$ having a γ structure, and
   a second step in which a second step mixture that contains the $Li_3PS_4$ having the γ structure obtained in the first step and LiX (where X is halogen) is non-crystallized, and the non-crystallized second step mixture is heated in a temperature range of more than 150° C. and less than 190° C.

2. The method for producing the sulfide solid electrolyte according to claim 1, wherein, in the first step, the $Li_3PS_4$ having the γ structure is obtained by non-crystallizing a first step mixture that contains $Li_2S$ and $P_2S_5$ in a molar ratio range of 74:26 to 76:24, and crystallizing the non-crystallized first step mixture by heating.

3. The method for producing the sulfide solid electrolyte according to claim 2, wherein, in the first step, a content of LiX in the first step mixture is less than 5.26% by mole with respect to a total amount of the $Li_2S$ and $P_2S_5$ therein.

4. The method for producing the sulfide solid electrolyte according to claim 1, wherein the sulfide solid electrolyte has peaks at 2θ=20°, 24° and 30° in X-ray diffraction measurement with CuKα radiation.

5. The method for producing the sulfide solid electrolyte according to claim 1, wherein, in the second step, the second step mixture is non-crystallized by mechanical milling.

* * * * *